United States Patent Office 3,677,987

Patented July 18, 1972

1

3,677,987
ORGANO POLYMER CEMENTS WITH EXTENDED WORKING TIME

Samuel A. Pence, Jr., Tulsa, Okla., assignor to The Dow Chemical Company, Midland, Mich.

No Drawing. Filed Jan. 26, 1970, Ser. No. 5,919
Int. Cl. C08f 29/00
U.S. Cl. 260—29.6 M 6 Claims

ABSTRACT OF THE DISCLOSURE

A small amount of cupric ions has been discovered to produce an induction period in the setting of an organo-gel cement modified with a soluble chromium compound, thereby giving the precursor liquid slurries of such cements more working time. These cements are prepared by slurrying a solid, water-soluble, organo-polymer in an organo-solvent for the polymer and incorporating small amounts of a hexavalent chromium compound and cupric ions. The slurry sets into a gel, which is generally stronger with increases in polymer concentration. The set-time, i.e., period during which the formulation can be readily worked as by pumping, may be extended several fold in the practice of the instant invention.

Organo-gel cements, as modified in my copending application Ser. No. 629,089, filed Apr. 7, 1967 now issued as U.S. 3,502,149, are finding an ever increasing range of uses. When utilized as grouting materials, such organo-gel cements produce excellent barriers to fluid flow in subterranean formations and seals between casings and geological formations. The organo-gel cements may also be molded to form self-sealing gaskets for use in water containing environments.

In all such uses of these cementitious materials, it is essential that there be working time during which the precursor slurry remains sufficiently liquid for convenient handling. As a liquid it can be pumped to remote application points or poured into molds. This working time, sometimes otherwise termed set-time, can be controlled to some degree in existing formulations by adjusting the solvency properties of the organo-solvent system or the amount and composition of the organo-polymer utilized in the preparation of the gel cement.

It would be highly desirable, however, and it is an object of the instant invention, to provide the capability of controlling the set-time without materially altering either the composition's ingredients or the relative proportions thereof. It is a further object of the instant invention to provide an induction period, the duration of which can be closely controlled, in the setting of organo-gel cements, as hereinafter described. It is a still further object and advantage of the instant invention that the foregoing be achieved with the employment of a relatively small amount of an additional ingredient in such formulations.

In pursuit of the foregoing objects and benefits, it has been discovered that the incorporation of a small amount of cupric ions into an organo-gel cement formulation, as hereinafter described, will increase the set-time of the formulation generally in proportion to the amount of cupric ions added. The cupric ions are effective at very low concentration levels, e.g. 1 part per million, and will produce delays in the set-times of organo-gel cements without significant detriment to other properties of the cement, when employed in amounts up to as much as

2

500 parts per million, based on the total weight of the formulation. The cupric ions are conveniently supplied to the formultaion in the form of a salt of a strong mineral acid such as cupric chloride, cupric sulfate, cupric nitrate and the like.

The invention is generally applicable to organo cementitious formulations, modified as described in my copending patent application Ser. No. 629,089, now issued as U.S. 3,502,149. These formulations comprise in essence a basic formulation of a water-soluble, solid, organic polymer slurried in an organo solvent for the polymer. Incorporated in the basic mixture are small amounts of a hexavalent chromium compound, usually as a water-solution, and cupric ions, again usually as a water-solution for convenient mixing. After suitable mixing to produce a uniform dispersion, the resulting formulation is applied as a liquid slurry which sets in place. It may be cast in molds to produce shaped articles or used to impregnate geological formations and soils as a barrier forming grout.

Polymers for use herein are water-soluble or water-dispersible homopolymers and copolymers prepared by polymerizing ethylenic monomers to produce a polymer having an average molecular weight of at least about 10,000 comprising repeating units having the generic structure:

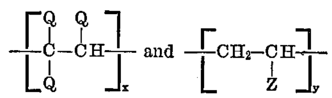

wherein, Q is independently selected from the class consisting of $CH_3$, H, Cl, CN, $C_6H_5$; and Z is independently selected from the class consisting of COOH, COOM, $CH_2COOH$, $CONH_2$, CONHR, and $CONR_2$, wherein R is a 1 to 4 carbon atom alkyl and M is selected from the class consisting of ammonium and alkali metals, and wherein $x$ is selected from the class consisting of 0 and integers up to, but exclusive of, such size as will render the polymer water-insoluble and wherein $y$ is selected from the class consisting of integers of such size as will render the polymer water-soluble and wherein the sum of $x$ and $y$ is sufficient to provide the required molecular weight.

Useful gels can be obtained utilizing as little as about 0.5 weight percent of the organo polymer based on the organo solvent. More rigid, higher strength gels are obtained with the use of higher concentrations of the polymer. Most rigid gel formulations use from about 0.1 up to as much as 2 parts by weight of the polymer per part by weight of the organo solvent. Although some water is always required to be employed in the practice of the invention, such amount may be very small, e.g. less than 1 percent of the total liquids employed. Often an adequate amount of water is provided by using technical grade glycerol or a glycol, both of which (being hydroscopic) contain from about 1 to 5 percent of water dissolved therein. Twenty percent of water based on the weight of total liquids present marks the maximum amount of water employed in the invention under normal ciircumstances. From about 3 percent to about 12 percent of water, based on the total weight of liquid present, is the more common range. Useful solid, organo polymers are further characterized as having a minimum viscosity, in a 2 percent by water solution of the polymer, of at least 10 centipoises.

Particularly suitable as the hexavalent chromium compounds are the potassium and sodium chromates and dichromates. From about 0.01 up to about 10.0 percent by weight of the chromium additive, based on total formulation weight, is known to significantly increase the strength of the finally set organo gel. The use of the chromium additive frequently makes it possible to significantly reduce the amount of organo polymer required to achieve a given strength. Further details as to the employment of this additive are set forth in my copending application Ser. No. 629,089, now issued as U.S. Pat. 3,502,149.

Water-soluble polymers and organo-solvents suitable for use in the instant invention include those described and exemplified in the copending application of Eilers et al. Ser. No. 486,530, filed Sept. 10, 1965, now issued as U.S. Pat. 3,511,313.

The contribution of the instant invention will be better understood by reference to the following examples from which it may be observed directly, and by inference, that the incorporation of cupric ions into organo gel cements produces an extended set time. Interestingly, the evidence supports an hypothesis of an "induction" period during which there is relatively little increase in the viscosity of a formulated organo-gel cement followed by the onset of gelation at a rate that would be expected for the formulation without the presence of cupric ions. This delay during the low viscosity stage, the length of which is controlled by the amount of cupric ions added, is an important capability with reference to the usual mode of application which involves pumping the cement slurries to the point of application. Moreover, when grouting a geological formation, significantly greater penetration of the formation is possible with lower viscosity slurries. It may thus be seen that the capability of controlling set time is a valuable addition to organo-gel cement technology.

The following examples will illustrate the operation of the invention.

EXAMPLE 1

An organo-gel cement, designed for commercial application was prepared generally in accordance with the teachings of my copending application Ser. No. 629,089, filed Apr. 7, 1967. The basic organo-gel cement was formulated according to the following recipe:

| Ingredients: | Wt. percent |
|---|---|
| Glycerin | 12.46 |
| Diethylene glycol | 44.13 |
| Water | 6.74 |
| Sodium dichromate | 0.17 |
| Silica | 2.80 |
| Polyacrylamide [1] | 33.70 |

[1] Essentially a homopolymer of acrylamide having a weight average molecular weight of at least about 1 million.

The formulation was prepared by first mixing the glycerin and diethylene glycol and then adding the chromate as a water solution to provide the relative proportions of these ingredients specified above. Next, the polymer solids and silica filler were slurried into the organo solvent mixture to prepare an organo-gel cement slurry weighing about 10.1 pounds per gallon.

One aliquot of the slurry was reversed for control purposes and to each of three additional aliquots were added small amounts of cupric ions. The amount of cupric ions added, on a total weight basis, and the viscosity history of the formulations as they set into rigid cementitious gels are reported in the following table. The viscosities were measured with a Brookfield Viscometer, Model LVF, spindle No. 4 at 12 r.p.m. The working-time of the formulation is taken as that time required to reach approximately 100 poise since at this viscosity the slurry is generally considered to be too viscous for convenient handling and emplacement as by pumping.

TABLE I

| Accumulated time (min.) | Viscosity of slurry (poise) (Control) 0 p.p.m. Cu | 51 p.p.m. Cu | 102 p.p.m. Cu | 204 p.p.m. Cu |
|---|---|---|---|---|
| 4 | 21 | 13 | 12 | 9 |
| 9 | 53 | 15 | 13 | 9 |
| 16 | 134 | 20 | 12 | 11 |
| 25 | 256 | 55 | 20 | 10 |
| 36 | 469 | 168 | 38 | 15 |
| 49 | | 326 | 144 | 46 |
| 55 | | 490 | | |
| 64 | | | 376 | 136 |
| 75 | | | | 486 |

Although cupric sulfate pentahydrate was utilized in the foregoing example to introduce cupric ions into the formulation of the instant invention, such ions may be readily supplied in the form of any water soluble salt. Preferably, the copper compounds have anions which are chemically compatible with the organo-gel, but this is not an absolute necessity in as much as only a very small amount of cupric ions is necessary to achieve the benefits of the instant invention. Examples of other cupric ion sources include cupric chloride and cupric nitrate.

EXAMPLE 2

An organo-gel cement designed for stabilizing earthen formations by injection therein was prepared and evaluated in a manner similar to Example 1. The basic organo-gel grouting cement was formulated according to the following recipe:

| Ingredients: | Wt. percent |
|---|---|
| Glycerin | 17.1 |
| Diethylene glycol | 60.8 |
| Water | 17.0 |
| Sodium dichromate | .05 |
| Polyacrylamide [1] | 5.05 |

[1] Same as used in Example 1, above.

One aliquot of the slurry was reserved for control purposes and to each of three additional aliquots were added small amounts of cupric ions. The amount of cupric ions added, on a total weight basis, and the viscosity history of the formulations as they set into rigid cementitious gels are reported in the following table.

TABLE II

| Accumulated time (min.) | Viscosity of slurry (poise) Control | 15.5 p.p.m. Cu | 31 p.p.m. Cu | 62 p.p.m. Cu |
|---|---|---|---|---|
| 9 | 5 | 0.5 | 1.0 | |
| 16 | 10 | 3.5 | 2.0 | 2.5 |
| 25 | 20 | 6 | 5.5 | 6 |
| 36 | 43 | 12 | 13 | 13 |
| 49 | 88 | 26 | 27 | 32 |
| 64 | 146 | 64 | 61 | 83 |
| 81 | 222 | 131 | 114 | 126 |
| 100 | 240 | 170 | 167 | 149 |
| 121 | 269 | 227 | 215 | 160 |
| 144 | 275 | 246 | 231 | 170 |
| 169 | | 249 | 236 | |
| 225 | 336 | 342 | 290 | 219 |

When the amount of chromium was doubled in the formulation described above, while keeping the cupric ion content at 62 p.p.m., the time required for the viscosity to reach 100 poise increased from about 64 minutes to about 144 minutes.

In a manner similar to the foregoing examples, essentially comparable increases in set time are achieved with the addition of cupric ions to other chromium modified organo-gel formulations, wherein the polyacrylamide employed above is replaced with one or more other polymeric materials such as sodium polyacrylate, ammonium polystyrene sulfonate, poly-N-vinyloxazolidone, poly-N-vinylpyrrolidone, and polyvinyl alcohol and the organo-solvent ingredients are replaced with one or more other organic solvents such as formamide, ethylene diamine, ethylene glycol, propylene glycol, and acetic acid. Other solvents include mixtures of organic liquids, which by themselves are not solvents for the polymers but, as mixtures with a small amount of water, produce an organo-solvent useful in the invention. Examples of such materials are diethylene glycol, diethylene glycol monomethylether, dipropylene glycol, dioxane, sucrose, urea and dextrin.

Preferred for use in the preparation of the polymerized organo-gels are water-solubble carbamoyl polymers as specifically illustrated in Examples 1 and 2 above. The most common forms of these are ethylenically polymerized polymers having attached along their polyalkane backbone a plurality of carbamoyl groups according to the formula:

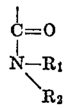

wherein $R_1$ and $R_2$ are independently selected from the group of hydrogen and alkyl hydrocarbons with 1 to 4 carbons.

In particular, useful carbamoyl polymers include the various water-soluble homopolymers and copolymers of acrylamide and methacrylamide. Other carbamoyl polymers are the various water-soluble copolymers of N-substituted acrylamides such as N-methyl acrylamide, N-propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole percent of the polymerized mers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to impart water-solubility to the finished polymer.

What is claimed is:

1. In an organo-gel cement composition comprising an organo-solvent; a water-soluble polymer characterized by the general formula

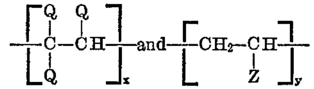

wherein Q is independently selected from $CH_3$, H, Cl, CN, $C_6H_5$; and Z is independently selected from COOH, COOM, $CH_2COOH$, $CONH_2$, CONHR and $CONR_2$ wherein R is an alkyl having 1 to 4 carbons and M is selected from ammonium and alkali metals and $x$ is an integer from 0 up to, but exclusive of, a size sufficient to render the polymer water-insoluble and wherein $y$ is an integer of sufficient size to render the polymer water-soluble, the sum of $x$ and $y$ being sufficient to provide a molecular weight of at least 10,000; up to 20 percent water, based on the weight of total liquid; and a hexavalent chromium compound, which composition is formulated as a liquid slurry and sets into a cementitious gel; the improvement which comprises incorporating a small but effective amount of cupric ions to extend the working time of the cement composition.

2. A composition as in claim 1 wherein the amount of cupric ion added is within the range from about 1 up to about 500 parts per million by weight, based on the weight of the organo-gel cement composition.

3. A composition as in claim 1 wherein the cupric ion is incorporated into the organo-gel cement formulation as cupric sulfate.

4. A composition as in claim 1 wherein the organo-gel cement formulation comprises a water-soluble carbamoyl polymer and an organo-solvent mixture of an organo-solvent for the polymer and an organo non-solvent.

5. The composition of claim 4 wherein the solvent mixture comprises glycerine and diethylene glycol.

6. A composition as in claim 4 wherein the organo-gel comprises from about 0.1 to about 2 parts of the polymer for each part by weight of the organo-solvent mixture, from about 0.01 up to about 10 percent by weight of the hexavalent chromium compound and from about 1 up to 500 parts per million, based on the total weight of the composition, of cupric ions.

References Cited

UNITED STATES PATENTS

| | | | |
|---|---|---|---|
| 3,086,950 | 4/1963 | Renner | 260—29.6 |
| 3,114,651 | 12/1963 | Gentile | 117—6 |
| 3,380,947 | 4/1968 | Galgoczi et al. | 260—29.6 |
| 3,502,149 | 3/1970 | Pence | 166—295 |

FOREIGN PATENTS 771,573 4/1957 Great Britain.

MELVIN GOLDSTEIN, Primary Examiner

U.S. Cl. X.R.

61—1, 36